US012604915B2

(12) United States Patent (10) Patent No.: US 12,604,915 B2
Raventos Cobo (45) Date of Patent: Apr. 21, 2026

(54) COCOA FOOD PREPARATION PRODUCT SUITABLE TO PREPARE A HOT CHOCOLATE DRINK AND PROCESS THEREOF

(71) Applicant: JUICE GARAGE, S.L., Girona (ES)

(72) Inventor: Marc Raventos Cobo, Girona (ES)

(73) Assignee: JUICE GARAGE, S.L., Girona (ES)

( * ) Notice: Subject to any disclaimer, the term of this patent is extended or adjusted under 35 U.S.C. 154(b) by 295 days.

(21) Appl. No.: 18/265,213

(22) PCT Filed: Dec. 2, 2021

(86) PCT No.: PCT/EP2021/084041
§ 371 (c)(1),
(2) Date: Jun. 2, 2023

(87) PCT Pub. No.: WO2022/117759
PCT Pub. Date: Jun. 9, 2022

(65) Prior Publication Data
US 2024/0099328 A1     Mar. 28, 2024

(30) Foreign Application Priority Data

Dec. 2, 2020    (ES) ............................... ES202031206

(51) Int. Cl.
| | |
|---|---|
| *A23G 1/56* | (2006.01) |
| *A23G 1/00* | (2025.01) |
| *A23G 1/46* | (2006.01) |
| *B65B 31/02* | (2006.01) |
| *B65D 81/34* | (2006.01) |

(52) U.S. Cl.
CPC ............. *A23G 1/56* (2013.01); *A23G 1/0009* (2013.01); *A23G 1/46* (2013.01); *B65B 31/02* (2013.01); *B65D 81/3461* (2013.01)

(58) Field of Classification Search
CPC .......... A23G 1/56; A23G 1/0009; A23G 1/46; A23G 1/30; A23G 1/32; A23G 1/50; A23G 1/0003; B65B 31/02; B65D 81/3461
USPC ............. 426/96–99, 106, 112, 115, 590–599
See application file for complete search history.

(56) References Cited

U.S. PATENT DOCUMENTS

| | | | | | |
|---|---|---|---|---|---|
| 3,922,363 | A | * | 11/1975 | Mitsuda | ................... B65B 31/00 |
| | | | | | 53/436 |
| 5,603,254 | A | * | 2/1997 | Fond | .................... A47J 31/0668 |
| | | | | | 426/433 |
| 5,879,731 | A | * | 3/1999 | Beckett | ................ A23G 3/2015 |
| | | | | | 426/103 |
| 5,894,031 | A | | 4/1999 | Caly et al. | |
| 2004/0166206 | A1 | * | 8/2004 | Archibald | ............... B32B 27/06 |
| | | | | | 426/106 |

| | | | | | |
|---|---|---|---|---|---|
| 2005/0008754 | A1 | * | 1/2005 | Sweeney | ............... A23C 9/1544 |
| | | | | | 426/590 |
| 2006/0024420 | A1 | * | 2/2006 | Kessler | ..................... A23F 5/32 |
| | | | | | 426/590 |
| 2009/0162489 | A1 | * | 6/2009 | Singh | ..................... A23C 11/02 |
| | | | | | 426/562 |
| 2012/0034366 | A1 | * | 2/2012 | Hoffman | ................. A23L 33/21 |
| | | | | | 426/658 |
| 2015/0367614 | A1 | * | 12/2015 | Sasaki | ..................... B32B 27/32 |
| | | | | | 428/522 |
| 2020/0375206 | A1 | * | 12/2020 | Zreyas | ................... A23C 11/04 |

FOREIGN PATENT DOCUMENTS

| | | | | | |
|---|---|---|---|---|---|
| DE | 296 19 978 U1 | 1/1997 | | | |
| ES | 2069505 A1 | 5/1995 | | | |
| ES | 2141023 A1 | 3/2000 | | | |
| GB | 2533121 A | * | 6/2016 | .............. | A23L 2/56 |
| JP | 2005192467 A | 7/2005 | | | |
| WO | 98/14069 A1 | 4/1998 | | | |
| WO | WO-2006074939 A2 | * | 7/2006 | ............. | A23G 1/505 |

OTHER PUBLICATIONS

"Healthline Best Dark Chocolate: The Ultimate Buyer's Guide." Mar. 3, 2020 <https://web.archive.org/web/20200303163137/https://www.healthline.com/nutrition/dark-chocolate-buyers-guide> (Year: 2020).*
Pittman, Christine ("Hot Chocolate in the Slow Cooker." Jun. 17, 2017 <https://web.archive.org/web/20170617070337/https://thecookful.com/hot-chocolate-in-the-slow-cooker/> (Year: 2017).*
"Long Live the Noms." 2014 <https://longlivethenoms.com/2014/12/26/creamy-slow-cooker-hot-chocolate/> (Year: 2014).*
"Mary's Nest—How to Make a Keto Powdered Coffee Creamer." Nov. 14, 2020. <https://web.archive.org/web/20201114162407/https://marysnest.com/how-to-make-a-keto-powdered-coffee-creamer/> (Year: 2020).*
FoodData Central—Dark Chocolate. Published Apr. 1, 2019. 5 pages <https://fdc.nal.usda.gov/food-details/170273/nutrients> (Year: 2019).*
FoodData Central—White Chocolate. Published Apr. 1, 2019. 8 pages. <https://fdc.nal.usda.gov/food-details/167571/nutrients> (Year: 2019).*
International Search Report for priority patent application PCT/EP2021/084041 prepared by the European Patent Office and having a mailing date of Mar. 7, 2022, 3 pgs., in English.

(Continued)

*Primary Examiner* — Viren A Thakur
(74) *Attorney, Agent, or Firm* — Jayne Saydah

(57) ABSTRACT

The present invention related to a food preparation product suitable to prepare of a hot chocolate drink and/or a hot chocolate cup drink. Furthermore, the present invention, relates to a manufacturing process of said food preparation product and a process to obtain a high quality a hot chocolate drink and/or a hot chocolate cup drink, from said food preparation product, the process being simple, clean, practical and fast. Furthermore, the invention relates to the use of food preparation product suitable to prepare of a hot chocolate drink and/or a hot chocolate cup drink suitable to be directly consumed at restaurants and cafes.

13 Claims, No Drawings

(56)             References Cited

OTHER PUBLICATIONS

Article authored by Rachel Matthews entitled "Hot Chocolate Mix for Dark Chocolate Lovers", dated Jan. 2, 2011 retrieved from the Internet at asouthernfairytale.com/2011/01/02/rich-dark-creamy-hot-chocolate-recipe/XP055883136 [retrieved on Jan. 24, 2022].
Written Opinion by the International Searching Authority for priority patent application PCT/EP2021/084041 prepared by the European Patent Office and having a mailing date of Mar. 7, 2022, 7 pgs., in English.

* cited by examiner

COCOA FOOD PREPARATION PRODUCT SUITABLE TO PREPARE A HOT CHOCOLATE DRINK AND PROCESS THEREOF

CROSS-REFERENCE TO RELATED APPLICATIONS

This application is a national stage under 35 U.S.C. § 371 of PCT patent application PCT/EP2021/084041 filed on 2 Dec. 2021, which is pending, which is hereby incorporated by reference in its entirety for all purposes, and to which the present application claims priority. PCT/EP2021/084041 claims priority to Spanish Patent Application P202031206 filed on 2 Dec. 2020, which is hereby incorporated by reference in its entirety for all purposes.

TECHNICAL FIELD

The present invention related to the field of food products and food preparations, particularly, it relates to a food preparation product suitable to prepare of a hot chocolate drink and/or a hot chocolate cup drink. Furthermore, the present invention, relates to a manufacturing process of said food preparation product and a process to obtain a high quality a hot chocolate drink and/or a hot chocolate cup drink, from said food preparation product, the process being simple, clean, practical, fast and safe. Furthermore, the invention relates to the use of food preparation product suitable to prepare of a hot chocolate drink and/or a hot chocolate cup drink at restaurants and cafes.

BACKGROUND OF THE INVENTION

Cup hot chocolate is also known as "chocolate suitable to make a hot chocolate drink", and may be based on cocoa powder, sugar, flours, starches, thickening agents, milk, fat, and usually other ingredients such as preservatives or water.

The elaboration process is not fast or clean, so to elaborate said hot drinking cup chocolate it is necessary to heat some water or milk in a cooking recipient, so that when it is very hot, it is removed from the heat and proceeds to dissolve the melted chocolate that is going to be used. Usually, it is necessary to reheat the mixture until it boils, said process must be repeated at least twice or three times to increase the density of chocolate to provide a good quality hot chocolate drink.

Additionally, this process requires constant stirring with a spoon or rod, thus it entails an excess of time, potential contaminations of the recipient, risk of burning the chocolate/cocoa, loss of substances through evaporation and the subsequent need to clean all the accessories, to all light's undesirable.

ES 2069505A1 describes a procedure for making a chocolate-based product that can be easily melted into the container using a microwave oven or hot water bath. In order to obtain said chocolate-based product, ES 2069505A1 uses a composition based on cocoa paste, cocoa butter and inverted sugar, making use of inverted sugar to obtain a creamy product when melted. However, the product obtained in ES 2069505A1, does not result in a hot chocolate drink of high quality and good viscosity.

Later, U.S. Pat. No. 5,894,0131 described a chocolate beverage mix and its preparation thereof. The chocolate beverage mix is prepared by mixing 90 parts by weight based on the total weight of the beverage mix of chocolate of compound confectionery pieces, with a size of 1 cm×0.25 cm×0.5 mm (0.00013 cm³) together with a powdered cocoa mix or powdered creamer (10 parts), to form the beverage mix. A beverage is obtained by adding 10 parts of the above beverage mix to 100 parts of hot milk and mixing. However, the present inventors have observed that after a long time stirring the mixture, a significant presence of lumps was obtained, yielding a chocolate beverage mixture, which was not homogeneous and had a highly sugary flavour.

Other alternatives were described in ES2141023 A wherein a food preparation suitable to prepare of a hot chocolate cup drink was disclosed. Said food preparation consisted of a plurality of small portions as scales or shavings, which, once dissolved in a liquid such as water or milk, thicken the mixture formed without having increase the temperature of the mixture until the boiling point is reached.

The composition of said food preparation, suitable to prepare of a hot chocolate cup drink, is made of small chocolate portions, as scales or flakes, comprising said portions, sugars from 30-80%, vegetable fat from 10-30%, emulsifier from 0-5%, thickener from 5-20%, cocoa from 10-20%, being more than 10% cocoa dry matter and aromas from 0-2%. The hot chocolate cup drink, is prepared by mixing the small chocolate portions with 250 ml of milk or water at a temperature 60° C. however, it was observed that reproduction of said composition provided a very liquid composition.

Furthermore, JP2005192467A relates to a process wherein a chocolate mix is supplied directly in a bag, so that the product once homogenized undergoes a solidification process, prior to consumption. JP2005192467A, has also de disadvantage that it employs a large number of additives and preservatives which affects the quality and texture of the product. Therefore, there is a need to develop a product composition that overcomes all the disadvantages described above and that allows the preparation of hot chocolate drinks in a fast, easy and clean way, which is also suitable to be prepared both in households as well as in restaurants and hotels.

SUMMARY OF THE INVENTION

Thus, the first aspect of the present invention relates to a composition product which comprises:
  a plurality of first solid portions of dark chocolate, which comprises at least,
    cocoa, with a cocoa content in a range from 50-85%,
    a sweetener,
  where said plurality of first solid portions are present in w/w % in the product composition in a range from 40-50%;
  a plurality of second solid portions comprising at least, cocoa butter and sweetener, or
  white chocolate;
  where the plurality of the second solid portions is present in w/w % in the product composition in a range from 5-20%;
  milk cream having a fat content from at least 35%, wherein the milk cream is present in w/w % in the composition product in a range from 35-45%,
  wherein the first solid portions and/or the second solid portions have a volume size from 0.005 cm³ to 30 cm³, and
  wherein the components of said composition are packed, without being homogenised, in a flexible bag and closed under vacuum conditions to provide a composition product.

The composition product of the first aspect allows the preparation of hot chocolate drinks in a fast, easy, safe and clean way. The composition product is also suitable to be used both in households as well as in restaurants and hotels. Additionally, the composition product of the first aspect allows the preparation of high-quality hot chocolate drinks having a high cocoa concentration, as well as good creaminess and viscosity. The hot chocolate drink obtained from the composition product has also good homogeneity and lack of lumps while keeping all the aromas, as evaporation of the components is prevented during storage and during preparation.

The composition product of the first aspect has the further advantage that it allows the preparation of a hot chocolate in a reproducible way, having the same characteristics, such as creaminess and texture while maintaining its organoleptic properties, such as test and aromas, during store and after preparation.

The second aspect of the present invention relates to a process to prepare the composition product of the first aspect, which comprises the steps of:

i) providing the composition of the first aspect or
    a composition which comprises at least:
        a plurality of first solid portions of dark chocolate, which comprises at least,
        cocoa, with a cocoa content in a range from 50-85%,
        a sweetener,
      where said plurality of first solid portions are present in w/w % in the product composition in a range from 40-50%;
        a plurality of second solid portions comprising at least,
        cocoa butter and sweetener, or
        white chocolate;
      where the plurality of the second solid portions is present in w/w % in the product composition in a range from 5-20%;
        milk cream having a fat content from at least 35%, wherein the milk cream is present in w/w % in the composition product in a range from 35-45%,
      wherein the first solid portions and/or the second solid portions have a volume size from 0.005 $cm^3$ to 30 $cm^3$, and ii) packing the components of the composition of step i), without being homogenised, in a flexible bag under vacuum conditions, and iii) closing the bag to provide the composition product.

The third aspect of the present invention relates to a process to prepare a hot chocolate drink from the product composition of the first aspect, the process comprising at least the steps of:

a) provide the composition product of the first aspect,
b) introduce the composition product of step a) in a microwave oven, wherein the product will remain inside for a period from 20 to 70 seconds, preferably at a power from 300 to 800 w;
c) extract the composition product from the microwave oven containing the hot chocolate drink and
d) optionally agitate the bag comprising the composition product, prior to opening said bag and serve the obtained hot chocolate drink-in a suitable recipient.

The process of the second aspect, has the advantage that shortens the standard elaboration process, which comprises the step such as heating at high temperatures, diluting with milk of water, stirring and dissolving the components, eliminating the risk of burning the chocolate, providing an unsatisfactory burn test or aroma, generating lumps and providing a chocolate drink which is not homogeneous or where phase separation may arise. The process of the second aspect, is also fast, easy and clean.

The third aspect of the present invention relates to a hot chocolate drink obtained or obtainable from the process of the second aspect.

The fourth aspect of the present invention relates to the use of the composition product of the first, second or third aspect to provide hot chocolate drink, preferably wherein the hot chocolate drink is ready to serve.

DETAILED DESCRIPTION OF THE INVENTION

Thus, the first aspect of the present invention relates to a composition product which comprises:

a plurality of first solid portions of dark chocolate, which comprises at least,
        cocoa, with a cocoa content in a range from 50-85%,
        a sweetener,
    where said plurality of first solid portions are present in w/w % in the product composition in a range from 40-50%;
    a plurality of second solid portions comprising at least,
    cocoa butter and sweetener, or
    white chocolate;
    where the plurality of the second solid portions is present in w/w % in the product composition in a range from 5-20%;
    milk cream having a fat content from at least 35%, wherein the milk cream is present in w/w % in the composition product in a range from 35-45%,
    wherein the first solid portions and/or the second solid portions have a volume size from 0.005 $cm^3$ to 30 $cm^3$, and
    wherein the components of said composition are packed, without being homogenised, in a flexible bag and closed under vacuum conditions to provide a composition product.

The size of the plurality of the first solid portions of dark chocolate and/or the size the plurality of the second solid portions, provide the composition product with the advantage that a homogeneous hot chocolate drink can be prepared fast and ready to be served, after being warmed or heated in the microwave oven for a short period of time. In a preferred embodiment of the first aspect, the plurality of the first solid portions of dark chocolate and/or the plurality of the second solid portions have a size from 0.01 to 20 $cm^3$. It has been seen that, the plurality of solid portions having a higher size volume provide a product composition that takes too long to be warmed up in the microwave oven and do not provide a homogeneous hot chocolate drink suitable for consumption. Furthermore, they also pose a high risk to be handled when used in the microwave oven, as the product composition explodes at almost all microwave power settings after a few seconds. Additionally, the plurality of the first solid portions of dark chocolate and/or the plurality of the second solid portions having a size volume smaller than 0.005 $cm^3$ provide a product composition which yields a hot chocolate with low viscosity, which is too liquid, thus not having an adequate texture to be used a as a hot chocolate drink The solid portions can be in the form of ounces, coins or pieces with different shapes such as square or round pieces. Preferably, the pieces are not in the form of flakes as they brake easily and does not ensure good reproducibility of the preparation of the product composition.

In a preferred embodiment of the first aspect, the composition may also comprise additional ingredients, selected from the group consisting of natural flavours, preservatives, proteins, fibres, colorants, emulsifiers such as sodium chloride or mixtures thereof.

In the context of the present invention the term dark chocolate having a total cocoa content from 50 to 85 w/w % is understood as that the sum of all cocoa components is from 50-85% to the total weight of the dark chocolate. The cocoa components comprise cocoa butter and cocoa paste. For instance, a dark chocolate having a cocoa content of 52% or dark chocolate 52% is understood as having 52% of cocoa butter and cocoa paste. In a preferred embodiment, the amount of cocoa butter in dark chocolate is of at least 26% of the total amount of dark chocolate.

In the context of the present invention, the white chocolate comprises at least cocoa butter and sweeteners. Preferably, white chocolate comprises, cocoa butter, sweeteners, milk or other ingredients such as sunflower or soy lecithin.

The cocoa butter and sweetener mixture of the second solid portions, may be provided as part of white chocolate or may be added to the mixture as two separate ingredients.

In the context of the present invention the term sweetener, comprises natural and artificial sugars. Artificial sugars can be selected from, maltitol, aspartame, saccharin, sorbitol, mannitol or xylitol. Natural sugars can be selected from, cane juice, molasses, natural brown sugar, panela, cane sugar, sorghum molasse, mead, birch syrup maple syrup, maple sugar In another preferred embodiment of the first aspect, the product composition has a total sweetener content, thus including at least the sweetener content of the first solid portions and the second solid portions, in a w/w % from 10-45%, preferably form 20-40%. The sweetener content helps to provide a hot chocolate drink, once prepared, having good stability, good homogeneity, without having lumps and also having good viscosity to be consumed.

In a preferred embodiment of the product composition of first aspect, the milk cream has a fat content from 35% to 85%, which provides a hot chocolate drink with a good creaminess while still providing a homogeneous mixture without phase separation of the creamy or fatty components. Furthermore, provides a hot chocolate drink, after being prepared, with a good viscosity and creaminess to be consumed.

In the context of the present invention the term hot chocolate drink is understood as a chocolate beverage served hot, at a temperature from 35 to 80° C., preferably, from 35 to 65° C., suitable to be drank in cup, glass or a container suitable for drinking hot beverage. The hot chocolate drink has a viscosity from 8,000 to 30,000 mPa·s, preferably from 8,500 to 25,000 mPa·s, even more preferably, from 8,500 to 20,000 mPa·s. The viscosity was measured at 40° C., by means of a Brookfield viscosimeter using viscosity probe 6 and speed 10.

In another preferred embodiment of the product composition of first aspect, the milk cream may also contain water, proteins in a range from 0.1 to 2.5 w/w % and/or carbohydrates and/or sweeteners in a range from 0.1 to of 5 w/w %.

In the context of the present invention the term "fat content" of the milk cream, comprises animal fat. However, the composition product may have additional fat content which can be present in the solid first solid black chocolate portion or in the second solid portion. Thus, when referring to the total fat content of the composition product, this will comprise animal fat and vegetable fat In another preferred embodiment of the first aspect, the total fat content in the composition product is at least 15% in a w/w % of the total composition, preferably from 20 to 55%, more preferably from 30-50%

In another preferred embodiment of the first aspect, the milk cream is sterilised milk cream. More preferably, the milk cream is pasteurized. More preferably, the milk cream is ultra-pasteurised sterilised milk cream, thus sterilised by means of a UHT (ultra-high temperature), process. This allows the store of the product composition without the use of refrigeration by means of a fridge or a freezer, thus the product composition can be easily transported, handled and stored.

The composition product of the first aspect, may be stored in the fridge if desired, prior to consumption. No preservatives are needed and the physical and organoleptic properties are preserved and not affected.

In the context of the present invention the term "the composition is packed", is understood as the composition being placed inside the flexible bag and closed. Preferably, closed and sealed.

In the context of the present inventions the term flexible bag is understood as a bag made of plastic materials, of at least plastic materials selected from homopolymers or copolymers of the list consisting of, polyethylene (PE), high density polyethylene, low density polyethylene, polypropylene (PP), polylactic acid (PLA), polyglycolic acid (PGA), polyester, polyethylene terephthalate (PET).

In another preferred embodiment of the first aspect, flexible bag can be a bag with a seal close system. Preferably, the flexible bag is a bag having a stopper adapted to be closed and/or sealed, or is a bag with a zip closing system or a bag closed and/or seal by creating a thermal seal with a sealing machine.

In the context of the present invention the term vacuum conditions comprise a reduction of pressure in the flexible bag, wherein the pressure inside bag can be from 0.9-0.1 bar, preferably from 0.8-0.3 bar, more preferably from 0.7-0.5 bar. The composition being packed in a flexible bag and under vacuum conditions allows a faster preparation of the hot chocolate drink while obtaining a homogenous hot chocolate drink without the presence of lumps.

The composition being packed in a flexible bag and under vacuum conditions, as described above, allows a more homogeneous distribution of the solid and liquid components of the composition across the flexible bag, improving the transport, as it is easiest to pack and more units can be packed. Additionally, it reduces the preparation time to obtain a hot chocolate drink ready to be consumed and improves the safety when used, as it prevents potential explosion of the composition product bag if the composition product is overheated or heated for longer than required.

The composition product of the first aspect has also de advantage that, allows the preparation of a hot chocolate in a reproducible way, having the same characteristics, such as creaminess and texture while maintaining its organoleptic properties, such as test and aromas, during store and after preparation.

The second aspect of the present invention relates to a process to prepare the composition product of the first aspect, which comprises the steps of:

i) providing the composition of the first aspect or
      a composition which comprises at least:
         a plurality of first solid portions of dark chocolate,
            which comprises at least, cocoa, with a cocoa content in a range from 50-85%, a sweetener, where said plurality of first solid portions are present in w/w % in the product composition in a range from 40-50%;

a plurality of second solid portions comprising at least, cocoa butter and sweetener, or white chocolate;

where the plurality of the second solid portions is present in w/w % in the product composition in a range from 5-20%;

milk cream having a fat content from at least 35%, wherein the milk cream is present in w/w % in the composition product in a range from 35-45%, wherein the first solid portions and/or the second solid portions have a volume size from 0.005 cm³ to 30 cm³, and ii) packing the components of the composition of step i), without being homogenised, in a flexible bag under vacuum conditions, and iii) and closing the bag to provide the composition product.

In a preferred embodiment of the second aspect, the vacuum conditions comprise a reduction of pressure in the flexible bag, wherein the pressure inside bag is from 0.9-0.1 bar, preferably from 0.8-0.3 bar, more preferably from 0.7-0.5 bar.

In a preferred embodiment of the second aspect, flexible bag is made of at least plastic materials selected from homopolymers or copolymers of the list consisting of, polyethylene (PE), high density polyethylene, low density polyethylene, polypropylene (PP), polylactic acid (PLA), polyglycolic acid (PGA), polyester, polyethylene terephthalate (PET) and mixtures thereof. More preferably, flexible bag is made of at least homopolymers or copolymers of polyethylene (PE), high density polyethylene, low density polyethylene, polypropylene (PP) or mixtures thereof.

The composition being packed in a flexible bag and under vacuum conditions allows a faster preparation of the hot chocolate drink while obtaining a homogenous hot chocolate drink without the presence of lumps. Furthermore, it allows a more homogeneous distribution of the solid and liquid components across the flexible bag, improving the transport, as it is easiest to pack and more units can be packed. Additionally, it reduces the warming times and/or power needed to provide a homogeneous hot chocolate drink and improves the safety when used, as it prevents potential explosion of the composition product bag if the composition product is overheated or heated for longer than required.

The process of the second aspect has also de advantage that, allows the preparation of a hot chocolate in a reproducible way, wherein the hot chocolate drink obtained has the same characteristics, such as creaminess and texture while maintaining its organoleptic properties, such as test and aromas.

The third aspect of the present invention relates to a process to prepare a hot chocolate drink from the composition product of the first aspect or from the composition product obtained from the second aspect, the process comprising at least the steps of:

a) providing the composition product of the first aspect, b) introducing the composition product of step a) in a microwave oven, wherein the composition product will remain inside for a period from 20 to 70 seconds, preferably at a power from 300 to 800 w;

c) extract the composition product from the microwave oven containing the hot chocolate drink and d) optionally, agitate the bag comprising the composition product, prior to opening said bag and optionally serve the obtained hot chocolate drink in a suitable recipient.

The process of the third aspect, has the advantage that shortens the standard elaboration process, which comprises the step such as heating at high temperatures, diluting with milk of water, stirring and dissolving the components, eliminating the risk of burning the chocolate, providing an unsatisfactory burn test or aroma, generating lumps and providing a chocolate drink which is not homogeneous or where phase separation may arise. The process of the third aspect, is also fast, safe, easy and clean.

In a preferred embodiment of the third aspect, the agitation can be performed manually by shaking, rubbing or kneading the bag or mechanically by means of a shaker or a mechanical robot adapted for shaking, rubbing or kneading.

In a preferred embodiment of the third aspect, the agitation step is carried for a period of at least 5 seconds, preferably from 5-15 seconds, more preferably from 15-30 seconds.

In a preferred embodiment of the third aspect, the composition product of step a) will remain inside microwave oven for a period from 20 to 70 seconds, more preferably from 30 to 45 seconds.

In a preferred embodiment of the third aspect, wherein the microwave oven power is set from 400-750 w or from 400-600 w.

In a more preferred embodiment of the third aspect, the composition product of step a) will remain inside microwave oven for a period from 30 to 60 seconds at a microwave oven power set from 300-600 w.

Furthermore, composition product and the conditions of step b) allow the performance of the agitating step in a very quick and practical way, as well as it also prevents any hand burning or bag rupture when the agitation is performed manually, as the temperature and pressure inside the flexible is not too high. The temperature outside the bag may vary from 32-54° C., depending on the composition used.

The fourth aspect of the present invention relates to a hot chocolate drink obtained or obtainable from the process of the second aspect.

The hot chocolate drink of the fourth aspect obtained or obtainable from the process of the third aspect has the advantage that has a high concentration of cocoa and good creaminess while having good homogeneity and total absence of lumps and phase separation. Furthermore, the hot chocolate drink once prepared does not show any shiny thin web nor any taste or aroma of burnt chocolate as the temperature of the mixture does not increase over 80° C., preferably over 70° C.

In a preferred embodiment of the fourth aspect, the hot chocolate drink is obtained or obtainable by the process comprising the steps of:

i) providing a composition which comprises at least:

a plurality of first solid portions of dark chocolate comprising at least, cocoa, with a cocoa content in a range from 50-85%, a sweetener, where said first solid portions are present in w/w % in the product composition in a range from 40-50%;

a plurality of second solid portions comprising at least, cocoa butter and sweetener, or white chocolate;

where the plurality of the second solid portions is
present in w/w % in the product composition in a
range from 5-20%;
milk cream having a fat content from at least 35%,
wherein the milk cream is present in w/w % in the
composition product in a range from 35-45%,
wherein the first solid portions and/or the second solid
portions have a volume size from 0.005 cm³ to 30 cm³,
ii) packing the components of step i), without being
homogenised, in a flexible bag under vacuum condi-
tions and closing the bag to provide a composition
product;
iii) introducing the composition product obtained in step
ii) in a microwave oven, wherein the composition
product will remain inside the oven for a period from
20 to 70 seconds, preferably at a power from 300 to 800
w;
iv) extracting the composition product from the micro-
wave oven containing the hot chocolate drink; and
v) optionally agitating the bag comprising the composi-
tion product, prior to opening said bag and serve the
obtained hot chocolate drink in a suitable recipient.

The hot chocolate drink of the third aspect is a chocolate
beverage served hot, at a temperature from 35 to 80° C.,
preferably, from 35 to 65° C., suitable to be drank in cup,
glass or a container suitable for drinking hot beverage. The
hot chocolate drink has a viscosity from 8,000 to 30,000
mPa·s, preferably from 8,500 to 25,000 mPa·s, even more
preferably, preferably from 8,500 to 20,000 mPa·s. The
viscosity was measured at 40° C., by means of a Brookfield
viscosimeter using viscosity probe 6 and speed 10.

The plurality of first solid portions of dark chocolate and
the plurality of the second solid portions are added to the
composition as solids or semisolids, whereas the milk cream
is added as a liquid. Other components in small concentra-
tions can be added with the milk cream, thus in the liquid
phase. After all ingredients are introduced inside the flexible bad, the pressure inside the bag is reduced to provide
vacuum conditions and the bad is closed, preferably also
sealed The fifth aspect of the present invention relates to the use
of the composition product of the first, second or third aspect
to provide hot chocolate drink, preferably wherein the hot
chocolate drink is ready to serve.

EXPERIMENTAL SECTION

Example 1

A flexible transparent plastic bag with sufficient capacity
to hold all the ingredients is provided, afterwards the fol-
lowing ingredients, as described below, are weighted and
introduced in the flexible plastic bag:
45 g of dark chocolate (72%) having 14.9 g de sweetener,
are provided, wherein the size of each dark chocolate
portion is of 3.2 cm³,
20 g of white chocolate, having 11.4 g de sweetener
wherein the size of each portion is of 0.01 cm³,
35 g of milk cream (UHT), with a fat content of 35%

The flexible plastic bag once packed is subjected to
vacuum conditions, thus to a reduction of pressure inside
bag of about 0.7 bar. Thus, a product ready to be commer-
cialized as a single dose is obtained. Multidose products can
also be prepared.

The obtained composition product can be stored in the
fridge until the time is ready to be consumed.

Once it wishes to be used, the closed monodose compo-
sition product is introduced in a microwave oven at a power
of 750 w for a period i of 30 s or at a power of 600 w for
a period of 45 s.

Once the composition product is extracted, it can be
manually shacked or kneaded for 15-20 s, while the plastic
bag is still closed. Afterwards, the plastic bag is opened or
a cut is made to empty the content in cup or a drinkable
recipient. The temperature and texture of the hot chocolate
drink can be modulated by shortening or lengthening the
warming time in the microwave.

TABLE 1

| | | | | distribution of portions and ingredients of example 1 | | |
|---|---|---|---|---|---|---|
| Example | Distribution of the portions | Amount in g | Portion size | Ingredients | | Amount in g |
| 1 | Plurality of 1ˢᵗ solid portions of Dark chocolate (72%) | 45 | 3.2 cm³ | Fat (45%) | | 20.3 |
| | | | | Sweetener (33%) | | 14.9 |
| | | | | Proteins, fibres & salt | | 9.8 |
| | Plurality of 2ⁿᵈ solid portions | 20 | 0.01 cm³ | Cocoa butter (34%) | | 6.8 |
| | | | | Sweetener (57%) | | 11.4 |
| | | | | Other ingredients | | 1.8 |
| | Milk cream | 35 | Liquid | Fat content 35% | | 12.3 |
| | | | | others ingredients (65%) | | 22.8 |

Example 2

Example 2 was carried out as example 1, using the following composition.

The size of the Plurality of 1st solid portions of black chocolate was 3.2 cm$^3$ and the size of each portion of the white chocolate was of 0.01 cm$^3$.

TABLE 2

| | | | | distribution of portions and ingredients of example 2 | | |
|---|---|---|---|---|---|---|
| Example | Distribution of the portions | Amount in g | Portion size | Ingredients | | Amount in g |
| 2 | Plurality of 1$^{st}$ solid portions of Dark chocolate (52%) | 50 | 3.2 cm$^3$ | Fat (35%) Sweetener Proteins, fibres & salt | | 17.5 25.5 8 |
| | Plurality of 2$^{nd}$ solid portions of white chocolate | 15 | 0.01 cm$^3$ | Cocoa butter (34%) Sweetener (57%) Other ingredients | | 5.1 8.6 1.3 |
| | Milk cream | 35 | Liquid | Fat content 35% others ingredients (65%) | | 28 7 |

Example 3

Example 3 was carried out as example 1, using the composition of table 3.

The size of the Plurality of 1st solid portions of black chocolate was 3.2 cm$^3$ and the size of each portion of the white chocolate was of 0.01 cm$^3$.

TABLE 3

| | | | | distribution of portions and ingredients of example 3 | | |
|---|---|---|---|---|---|---|
| Example | Distribution of the portions | Amount in g | Portion size | Ingredients | | Amount in g |
| 3 | Plurality of 1st solid portions of Dark chocolate (85%) | 40 | 3.2 cm$^3$ | Fat (48%) Sweetener (14.5%) Proteins, fibres and salt | | 19.2 5.8 15 |
| | Plurality of 2$^{nd}$ solid portions | 7 | 0.01 cm$^3$ | Cocoa butter (34%) Sweetener (57%) Other ingredients | | 2.4 4 0.6 |
| | Milk cream | 45 | Liquid portion | Fat content (35%) others ingredients (62%) Sweetener (3%) | | 15.2 27.9 1.4 |
| | Flavouring | 1 | | Added in the liquid portion | | 1 |
| | Proteins | 3 | | Added in the liquid portion | | 3 |
| | Sweeteners | 4 | | Added in the liquid portion | | 4 |

TABLE 4

| | | | | effect of the size of the solid portions on hot chocolate drink | | | | |
|---|---|---|---|---|---|---|---|---|
| Example composition | Size of the 1$^{st}$ solid portions of black chocolate in cm$^3$ | Size of the 2$^{st}$ solid portions of white chocolate in cm$^3$ | Is the hot chocolate drink suitable to be consumed? | T inside the bag in ° C. right after completion of the microwave step | Time in s | Power | Vacuum conditions in bar | Comments |
| 1 | 0.01 | 0.01 | Yes | 66 | 45 | 600 | 0.7 | |
| 1 | 3.2 | 0.01 | No | — | 45 | 600 | 1.01 No vacuum | Bag exploded |
| 1 | 3.2 | 0.01 | Yes | 66 | 45 | 600 | 0.7 | |
| 1 | 7.8 | 0.01 | Yes | 78 | 45 | 600 | 0.7 | |
| 1 | 11.7 | 0.01 | Yes | 75 | 45 | 600 | 0.7 | |
| 1 | 0.01 | 0.01 | Yes | 77 | 60 | 450 | 0.7 | |

TABLE 4-continued effect of the size of the solid portions on hot chocolate drink

| Example composition | Size of the 1<sup>st</sup> solid portions of black chocolate in cm³ | Size of the 2<sup>st</sup> solid portions of white chocolate in cm³ | Is the hot chocolate drink suitable to be consumed? | T inside the bag in ° C. right after completion of the microwave step | Time in s | Power | Vacuum conditions in bar | Comments |
|---|---|---|---|---|---|---|---|---|
| 1 | 3.2 | 0.01 | No | — | 60 | 450 | 1.01 No vacuum | Bag exploded |
| 1 | 3.2 | 0.01 | Yes | 63 | 60 | 450 | 0.7 | |
| 1 | 7.8 | 0.01 | Yes | 72 | 60 | 450 | 0.7 | |

TABLE 5

Temperature and viscosity of the hot chocolate drink obtained after being prepared in the microwave.

| Examples | Temperature of the hot chocolate drink (° C.) after being warmed in the microvave | Viscosity (mPa · s) |
|---|---|---|
| 1 | 44.5 | 12,000 |
| 2 | 36.5 | 11,200 |
| 3 | 50.5 | 9.000 |
| Example 1 of U.S. Pat. No. 5,894,031 | | 7,200 |
| Example of ES2141023A1* | | Too liquid, viscosity could not be measured |

The viscosity was calculated by means of the method described above, wherein the hot chocolate drink is slowly cold down a bit until 40° C.are reached.

Example of ES2141023A1*, was carried out using 100 g of chocolate flakes in 200 ml and 100 g in 150 ml of milk, as the document did not specify the proportions used to prepare the chocolate drink.

The invention claimed is:

1. A composition product comprising:
a plurality of first solid portions of dark chocolate comprising at least cocoa, with a cocoa content in a range from 50-85% and a sweetener, wherein the plurality of first solid portions of dark chocolate is present in w/w % in the composition product in a range from 40-50%;
a plurality of second solid portions comprising at least, white chocolate; wherein the plurality of the second solid portions is present in w/w % in the composition product in a range from 5-20%;
milk cream having a fat content from at least 35%, wherein the milk cream is present in w/w % in the composition product in a range from 35-45% and the milk cream is a liquid,
wherein the plurality of first solid portions of dark chocolate and the plurality of second solid portions each have a volume size from 0.005 cm³ to 30 cm³, and
wherein the plurality of first solid portions of dark chocolate, the plurality of second solid portions and the milk cream of the composition product are packed, without being homogenized, in a flexible bag sealed under vacuum conditions to provide the composition product, and wherein the composition product is configured for microwave heating in the flexible bag to provide a homogeneous hot chocolate drink.

2. The composition product according to claim 1, wherein the milk cream has a fat content in a w/w % from 35% to 85%.

3. The composition product according to claim 1, wherein the composition product is packed and sealed in the flexible bag which comprises a zip closing system, a stopper adapted to be closed or sealed, or wherein the flexible bag has a thermal seal adapted to be closed or sealed.

4. The composition product according to claim 1, wherein a total sweetener content of the composition product in a w/w % is from 10-45%.

5. The composition product according to claim 1, wherein the vacuum conditions provide a pressure in the flexible bag from 0.9-0.1 bar.

6. The composition product according to claim 1, wherein the plurality of the first solid portions of dark chocolate or the plurality of the second solid portions have a volume size from 0.01 cm³ to 20 cm³.

7. The composition product according to claim 1, wherein a fat content in the composition product is at least 15% in a w/w % of the composition product.

8. The composition product according to claim 1, wherein the milk cream is pasteurized.

9. The composition product according to claim 1, wherein the flexible bag is made of a plastic material selected from the group consisting of homopolymers or copolymers of polyethylene (PE), high density polyethylene, low density polyethylene, polypropylene (PP), polylactic acid (PLA), polyglycolic acid (PGA), polyester and polyethylene terephthalate (PET) or mixtures thereof.

10. A method of preparing a packaged composition product, the method comprising the steps of:
(a) providing a composition product which comprises:
a plurality of first solid portions of dark chocolate, which comprises at least cocoa, with a cocoa content in a range from 50-85% and a sweetener, wherein the plurality of first solid portions of dark chocolate is present in w/w % in the composition product in a range from 40-50%;
a plurality of second solid portions comprising at least, white chocolate; wherein the plurality of the second solid portions is present in w/w % in the composition product in a range from 5-20%;
milk cream having a fat content from at least 35%, wherein the milk cream is present in w/w % in the composition product in a range from 35-45% and the milk cream is a liquid,
wherein the plurality of first solid portions of dark chocolate and the plurality of second solid portions each have a volume size from 0.005 cm³ to 30 cm³, and
(b) packing the plurality of first solid portions of dark chocolate, the plurality of second solid portions and the milk cream of the composition product, without being homogenized, into a flexible bag under vacuum conditions, and (c) sealing the flexible bag that is under vacuum conditions, to provide the packaged composition product, and wherein the packaged composition product is configured for microwave heating in the flexible bag to provide a homogeneous hot chocolate drink.

11. The method according to claim 10, wherein the vacuum conditions provide a pressure in the flexible bag from 0.9-0.1 bar.

12. A method of making a hot chocolate drink from a composition product, the composition product comprising:

a plurality of first solid portions of dark chocolate comprising at least cocoa, with a cocoa content in a range from 50-85% and a sweetener, wherein the plurality of first solid portions of dark chocolate is present in w/w % in the composition product in a range from 40-50%;

a plurality of second solid portions comprising at least, white chocolate; wherein the plurality of the second solid portions is present in w/w % in the composition product in a range from 5-20%;

milk cream having a fat content from at least 35%, wherein the milk cream is present in w/w % in the composition product in a range from 35-45% and the milk cream is liquid, wherein the plurality of first solid portions of dark chocolate and the plurality of second solid portions each have a volume size from 0.005 cm3 to 30 cm3, and wherein the plurality of first solid portions of dark chocolate, the plurality of second solid portions and the milk cream of the composition product are packed, without being homogenized, in a flexible bag and sealed under vacuum conditions to provide the composition product and wherein the composition product is configured for microwave heating in the flexible bag to provide a homogeneous hot chocolate drink; and the method comprising the steps of:

(a) providing the composition product;

(b) introducing the composition product of step (a) in a microwave oven and heating the composition product inside the microwave oven for a period from 20 to 70 seconds;

(c) extracting the composition product from the microwave oven after the heating is completed to obtain the hot chocolate drink within the flexible bag;

(d) optionally agitating by shaking, rubbing, or kneading the flexible bag after the extracting and prior to opening the flexible bag; and (e) opening the flexible bag after the extracting or the agitating, and serving the hot chocolate drink in a receptacle.

13. The method according claim 12, wherein the hot chocolate drink has a viscosity measured at 40° C. with a viscosimeter, from 8,000 to 30,000 mPa·s.

* * * * *